United States Patent

Aspinwall et al.

[11] 3,727,761
[45] *Apr. 17, 1973

[54] FLUID FILTER

[75] Inventors: Ronald A. Aspinwall, Detroit; MacKellar K. Graham, Birmingham, both of Mich.

[73] Assignee: Sperry Rand Corporation, Troy, Mich.

[*] Notice: The portion of the term of this patent subsequent to Aug. 10, 1988, has been disclaimed.

[22] Filed: Feb. 12, 1971

[21] Appl. No.: 114,825

Related U.S. Application Data

[63] Continuation-in-part of Ser. No. 855,693, Sept. 5, 1969, Pat. No. 3,598,237.

[52] U.S. Cl. .................... 210/130, 210/223, 210/456
[51] Int. Cl. .............................................. B01d 27/10
[58] Field of Search ................... 209/215, 223, 224; 210/42, 90, 130, 222, 223, 456

[56] References Cited

UNITED STATES PATENTS

| | | |
|---|---|---|
| 2,360,020 | 10/1944 | Skinner et al. ................... 210/456 X |
| 2,690,842 | 10/1954 | Spluvak ........................... 210/222 X |
| 2,773,602 | 12/1956 | Sylvester .......................... 210/456 X |
| 2,870,914 | 1/1959 | Bloch ............................... 210/456 X |
| 3,371,790 | 3/1968 | Kudlaty et al. ..................... 210/223 |
| 3,598,237 | 8/1971 | Aspinwall et al. .................. 210/130 |

Primary Examiner—Samih N. Zaharna
Attorney—Barnes, Kisselle, Raisch & Choate

[57] ABSTRACT

A filter including a cylindrical filter element which is arranged to normally have fluid pass therethrough. A bypass valve is provided to bypass fluid directly to the outlet when the pressure at the inlet becomes excessive. A magnetized helical coil is provided adjacent the filter element to attract metal particles.

13 Claims, 7 Drawing Figures

INVENTORS
RONALD A. ASPINWALL
MACKELLAR K. GRAHAM
By Barnes, Kisselle, Raisch & Choate
ATTORNEYS

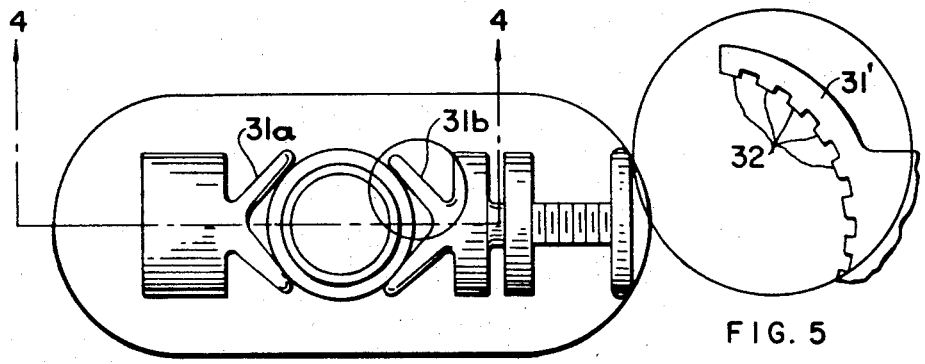
FIG. 3
FIG. 5
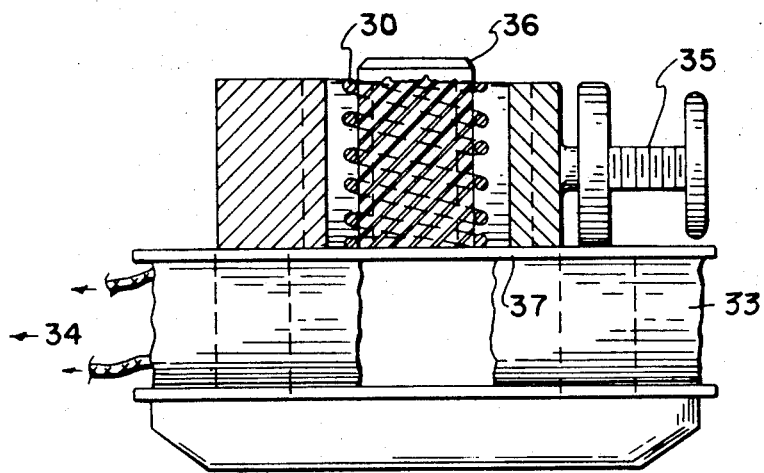
FIG. 4

FLUID FILTER

This application is a continuation-in-part of application Ser. No. 855,693, filed Sept. 5, 1969, now issued as U.S. Pat. No. 3,598,237, issued Aug. 10, 1971.

This invention relates to fluid filters.

BACKGROUND OF THE INVENTION

In fluid filters that are utilized for filtering hydraulic fluids and the like, it is desirable to provide some means to attract metal particles and remove them from the hydraulic system.

Among the objects of the invention are to provide a filter having a novel means for removing metal particles from the fluid and to provide a novel method of forming the same.

SUMMARY OF THE INVENTION

A filter including a cylindrical filter element which is arranged to normally have fluid pass therethrough. A linear bypass valve is provided to bypass fluid directly to the outlet when the pressure at the inlet becomes excessive. A magnetized coil is provided adjacent the filter element to attract metal particles.

DESCRIPTION OF THE DRAWINGS

FIG. 3 is a top plan view of an apparatus for magnetizing a part of the filter.

FIG. 4 is a sectional view taken along the line 4—4 in FIG. 3.

FIG. 5 is a fragmentary plan view on an enlarged scale of a portion of a modified form of apparatus for magnetizing a part of the filter.

DESCRIPTION

Figure 1:
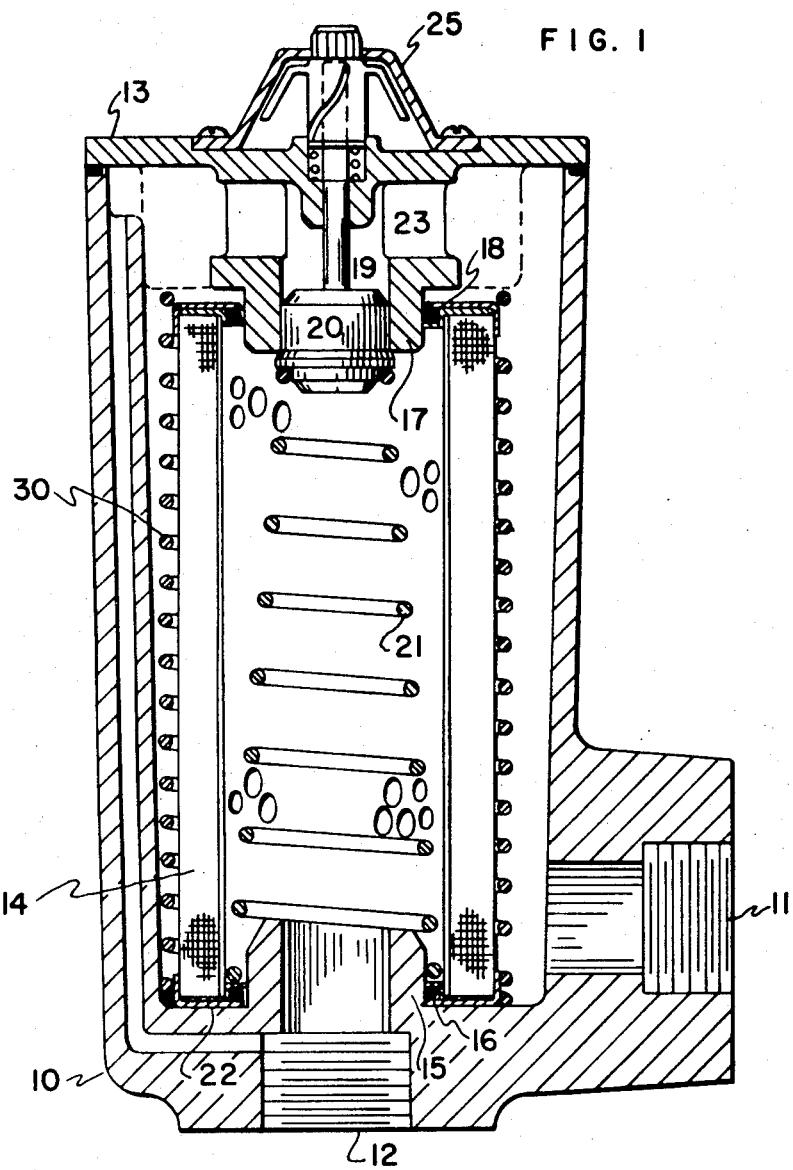
FIG. 1 is a longitudinal sectional view of a filter embodying the invention.

Referring to FIG. 1, a filter embodying the invention comprises a generally cylindrical housing 10 having a radial inlet 11 and an axial outlet 12. The housing includes a removable cover 13 that closes one end thereof opposite the axial outlet 12.

A cylindrical filter element 14 is positioned within the housing and has one end thereof sealingly engaging an axial projection 15 with an O-ring 16 forming the seal.

The other end of the filter element 14 is identical in construction and forms a seal with an axial projection 17 on the cover with an O-ring 18 again forming the actual seal.

The projection 17 includes an opening 19 in which a bypass valve 20 is positioned. The bypass valve 20 is yieldingly urged outwardly and upwardly as viewed in FIG. 1 by a helical spring 21 that is interposed between the valve 20 and the other end of the filter element. The spring also serves the additional function of maintaining the filter element against the shoulder 22 of the filter, but that is not its principal function. Axial projection 17 includes radial openings 23 that provide fluid communication between the inlet 11 and the other end of the bypass valve 20.

When the filter 14 becomes dirty, the bypass valve 20 will move axially inwardly and eventually open permitting fluid to be bypassed directly to the outlet 12. Indicating means 25 are provided on the cover 13 to indicate the fact that the filter is dirty and that the bypass valve has moved. Specifically, indicating means forms no part of the present invention.

Figure 2:
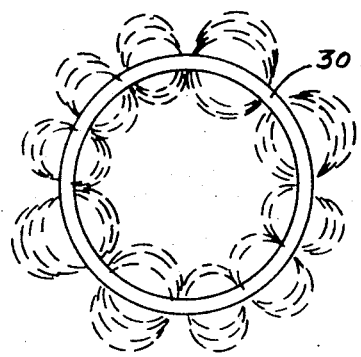
FIG. 2 is a diagrammatic view of the method of operation.

A coil 30 surrounds the filter element and is interposed between the cover and the housing. As shown diagrammatically in FIG. 2, each convolution of the coil 30 is magnetized in with alternating north-south poles along its length in order to collect ferrous metal particles in the fluid which might tend to pass through the filter.

The coil 30 is preferably made of a readily magnetizable material such as Cunife I which has a composition of 60% copper, 20% nickel and 20% iron. This material is ductile and has a degree of resiliency and if desired can be used as a spring. In addition it can be readily permanently magnetized so that the resultant magnetized coil or spring has strong magnetic properties.

Although the coil 30 has been shown in helical form, the wire material can be formed in undulating form comprising generally vertical legs connected by loops to produce a one-piece generally cylindrical element which surrounds the filter element.

Spring 21 is also preferably magnetized, made of the same material as coil 30 and in addition to biasing valve 20, functions to collect ferrous particles when the bypass valve has moved to permit fluid to be bypassed.

In accordance with the invention, coil 30 is magnetized utilizing the apparatus shown in FIGS. 3 and 4. The spring is placed on a core 36 interposed between jaws 31a, 31b and the jaws are caused to clamp the spring. Jaws 31a, 31b contact spaced peripheral portions of the spring. Each jaw 31 forms one pole of a magnetic coil 33 that is energized from a DC power supply 34. The jaw or pole piece 31b is movable by a screw 35 to accommodate insertion and removal of the spring. When in position for magnetization, the coil rests on a plate 37 of non-magnetic material.

In the form of the invention shown in FIG. 5, jaws 31' have a plurality of spaced contact portions such that a greater number of north-south poles are provided along the length of the coil 30.

The apparatus shown can also be utilized for magnetizing other forms of magnetic element such as the sinuous type described above.

Figure 6:
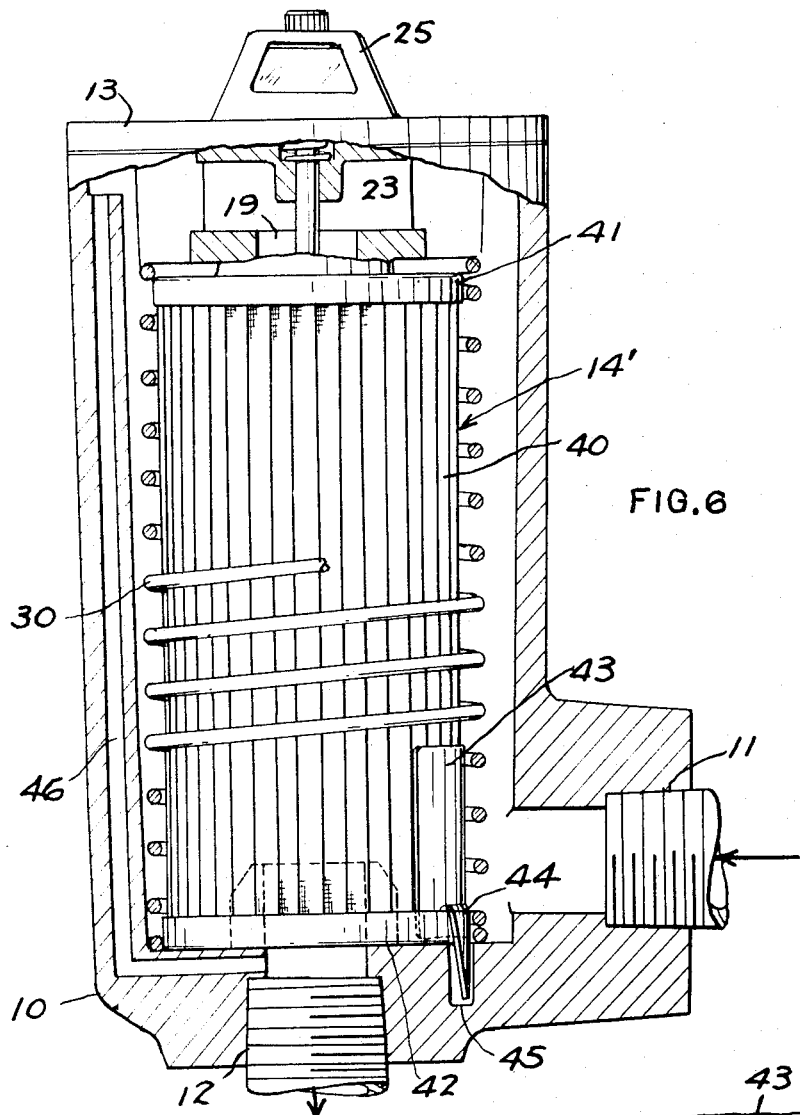
FIG. 6 is a longitudinal part sectional view of a modified form of the invention.
Figure 7:
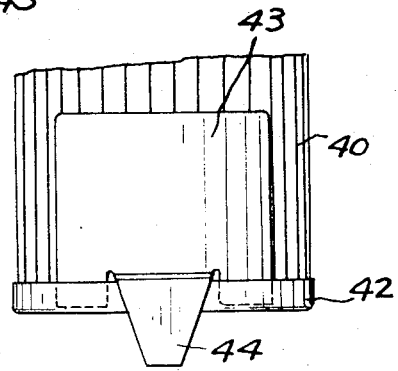
FIG. 7 is a view taken in the direction of the arrow 7 in FIG. 6, parts being broken away.

In the form of the invention shown in FIGS. 6 and 7, cylindrical filter elements 14' which comprises a corrugated filtration media such as a screen 40 having metal end caps 41, 42, a baffle 43 is provided between the screen 40 and the lower cap 42. The baffle 43 is frictionally held between the cap and the screen 40 and adhered thereto by epoxy resin. The baffle 43 comprises an arcuate piece of thin sheet metal which conforms to a portion of the outer periphery of the filter. The position of the baffle is aligned with the inlet 11. The baffle includes an outwardly struck tapered tab 44 that extends axially downwardly into an opening 45 in the housing in order to circumferentially orient the baffle and the filter in the housing.

The filter is preferably and normally used with the inlet 11 extending vertically downwardly. An air passage 46 provides an air bleed. The low flow velocities in the filter and the preferential fluid flow through the element assure a virtually stagnant fluid condition at the air bleed entrance. Very little, if any, fluid passes through the air bleed and that fluid that does by-pass contains a negligible amount of contaminant.

In operation, liquid flows inwardly through inlet 11 and is deflected by the baffle circumferentially outwardly causing the liquid to follow the spiral space between the convolutions of the coil 30.

It has been found that by this arrangement the liquid is caused to flow upwardly a greater axial distance so that a greater portion of the filter screen 40 is utilized and, as a result, there is a lesser pressure drop across the filter element 14'.

We claim:

1. A filter comprising
a housing,
a filter element in said housing,
said housing having an inlet extending to one side of said filter element and an outlet extending to the other side of said filter element,
means on said housing closing one end of said filter element, and
a movable bypass valve closing the other end of said filter element,
means communicating between the inlet side of said housing and said valve to cause movement of said valve when the pressure exceeds a predetermined value,
a magnetized wire element surrounding said filter element in spaced relation thereto,
said wire element comprising a helical coil spring,
said helical coil spring being magnetized in alternating north and south poles along its length,
said filter including a spring urging said bypass valve to a closed position,
said last-mentioned spring being magnetized in alternating north and south poles along its length, and
a baffle element in the path of said inlet for deflecting the fluid circumferentially into the spaces between the portions of the wire element.

2. A filter comprising
a housing,
a filter element in said housing,
said housing having an inlet extending to one side of said filter element and an outlet extending to the other side of said filter element,
means on said housing closing one end of said filter element, and
bypass valve means closing the other end of said filter element,
means communicating between the inlet side of said housing and said valve means to cause relative movement of said valve and said filter when the pressure exceeds a predetermined value,
a sinuous magnetized wire element interposed between opposed portions of said housing and surrounding said filter element in spaced relation thereto,
said sinuous magnetized wire element being magnetized in alternating north and south poles along its length, and
a baffle element in the path of said inlet for deflecting the fluid circumferentially into the spaces between the portions of the wire element.

3. The combination set forth in claim 2 wherein said wire element comprises a helical coil.

4. The combination set forth in claim 2 wherein said baffle element forms a part of said filter element.

5. The combination set forth in claim 2 wherein said filter element comprises a corrugated body member of perforated material and end caps on said body member,
said baffle element being interposed between one of said end caps and said corrugated body member.

6. The combination set forth in claim 2 including means for circumferentially orienting said filter element to circumferentially orient said baffle in alignment with said inlet.

7. The combination set forth in claim 6 wherein said last-mentioned means comprises a portion of said baffle extending axially outwardly,
said housing having an opening receiving said last-mentioned portion.

8. The combination set forth in claim 2 wherein said magnetized wire element comprises a wire element including generally vertical legs connected by loops in a generally cylindrical configuration.

9. A filter comprising
a housing,
a filter element in said housing,
said housing having an inlet extending to one side of said filter element and an outlet extending to the other side of said filter element,
means on said housing closing one end of said filter element, and
bypass valve means closing the other end of said filter element,
means communicating between the inlet side of said housing and said valve means to cause relative movement of said valve and said filter when the pressure exceeds a predetermined value,
a helical magnetized wire element surrounding said filter element in spaced relation thereto,
said helical magnetized wire element being magnetized in alternating north and south poles along its length, and
a baffle element in the path of said inlet for deflecting the fluid circumferentially into the spaces between the portions of the wire element.

10. The combination set forth in claim 9 wherein said wire element comprises a helical coil spring.

11. The combination set forth in claim 9 wherein said filter includes a spring urging said bypass valve means to a closed position,
said last-mentioned spring being magnetized in alternating north and south poles along its length.

12. The combination set forth in claim 9 wherein said magnetizing wire element comprises a strongly magnetic material.

13. The combination set forth in claim 12 wherein said material comprises Cunife I.

* * * * *